Oct. 21, 1941.  F. FRANZ  2,259,745
COMMERCIAL PHONOGRAPH
Filed Aug. 1, 1939  13 Sheets-Sheet 4

INVENTOR
Frederick Franz
BY
Blair, Curtis, Dunne + Hayward
ATTORNEYS

Oct. 21, 1941.                F. FRANZ                    2,259,745
                        COMMERCIAL PHONOGRAPH
                         Filed Aug. 1, 1939           13 Sheets-Sheet 6

INVENTOR
Frederick Franz
BY
Blair, Curtis, Dunne & Hayward
ATTORNEYS

Oct. 21, 1941.   F. FRANZ   2,259,745
COMMERCIAL PHONOGRAPH
Filed Aug. 1, 1939   13 Sheets-Sheet 7
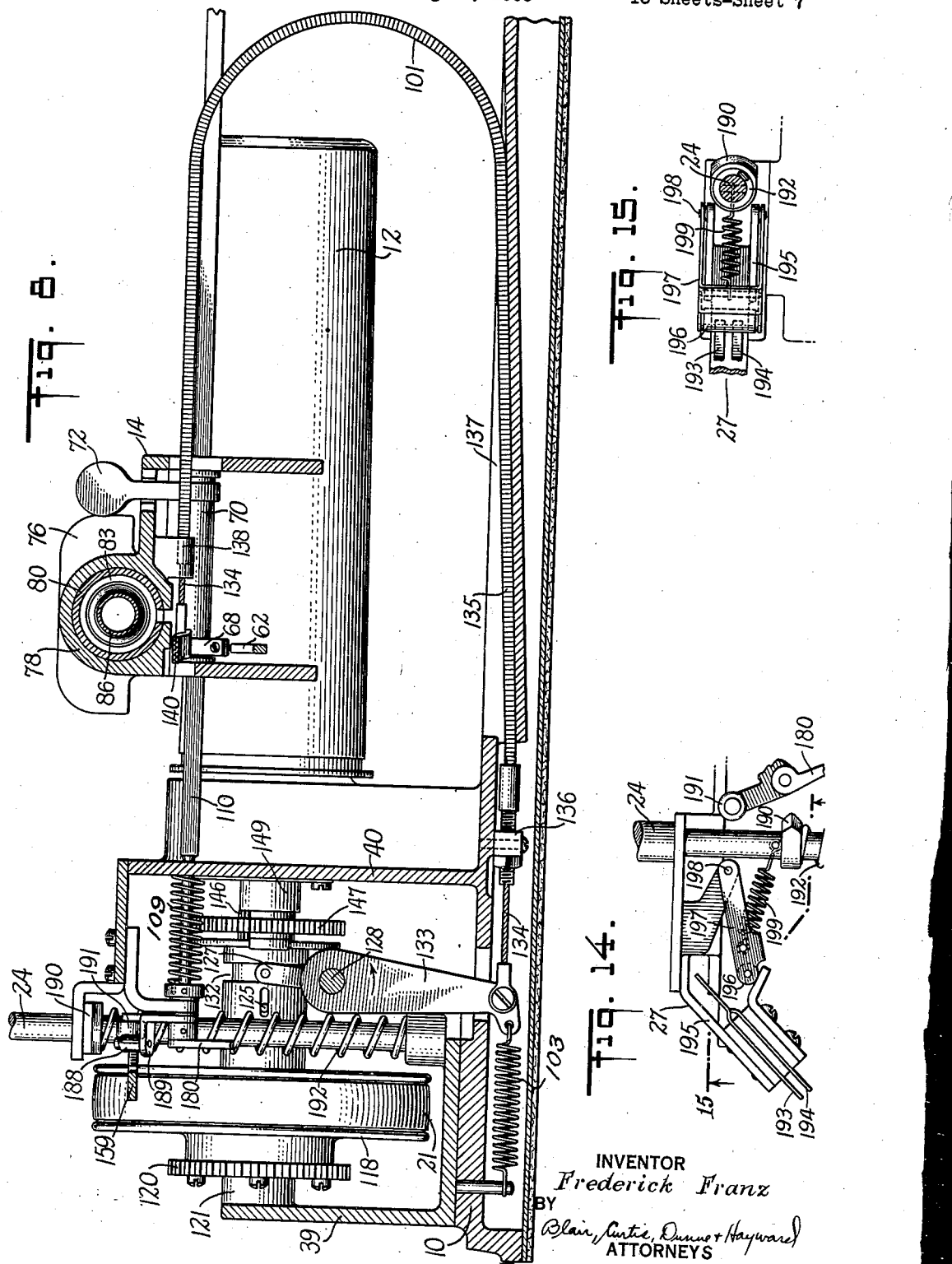
INVENTOR
Frederick Franz
BY
Blair, Curtis, Dunne & Hayward
ATTORNEYS

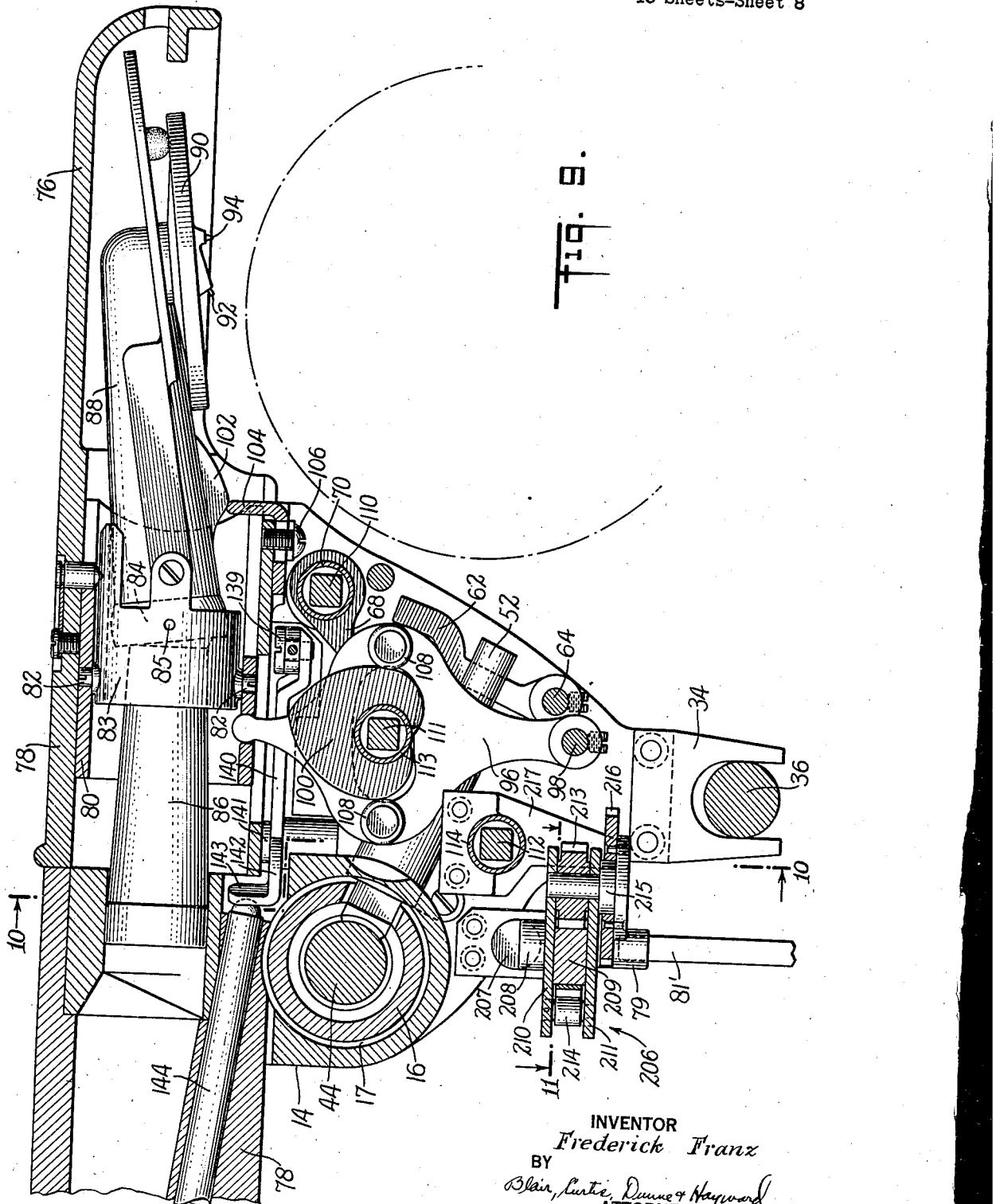

Oct. 21, 1941.  F. FRANZ  2,259,745
COMMERCIAL PHONOGRAPH
Filed Aug. 1, 1939  13 Sheets-Sheet 9
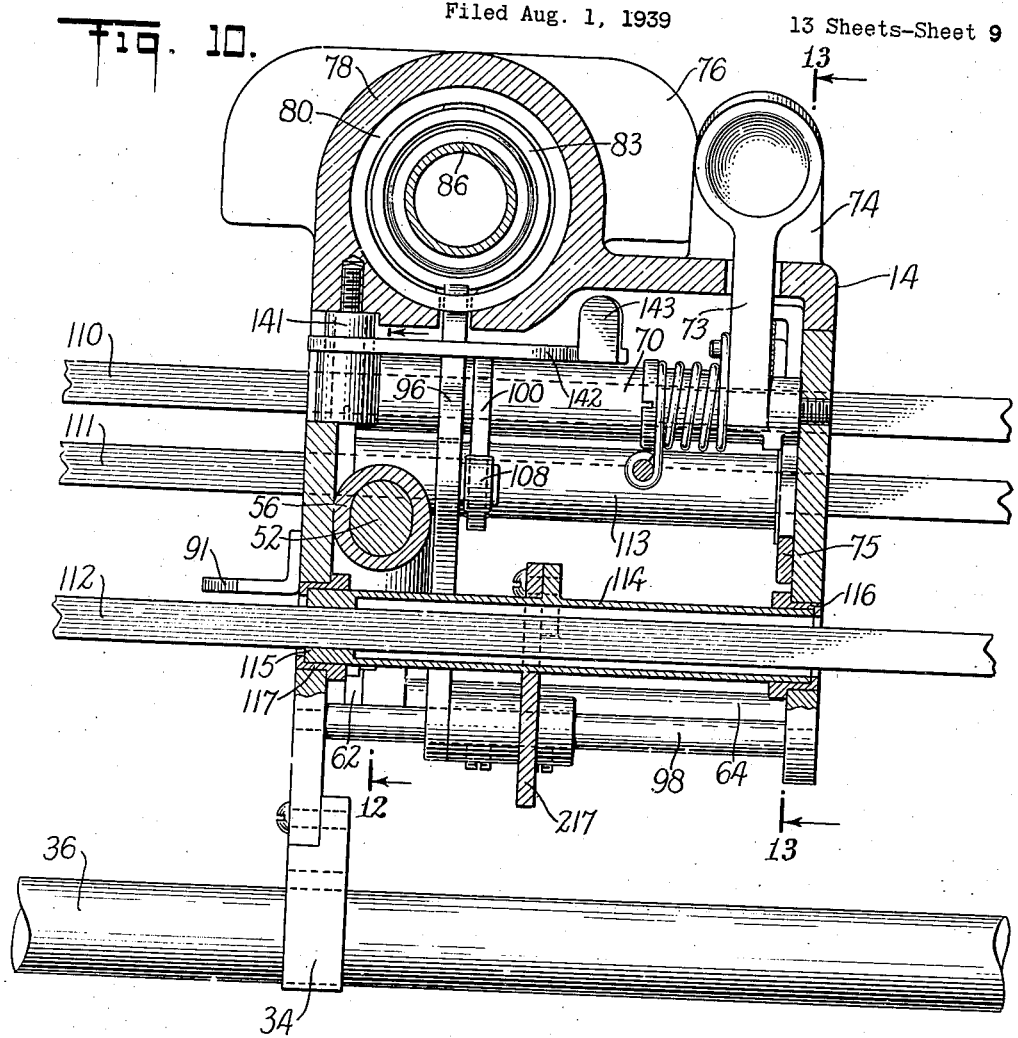
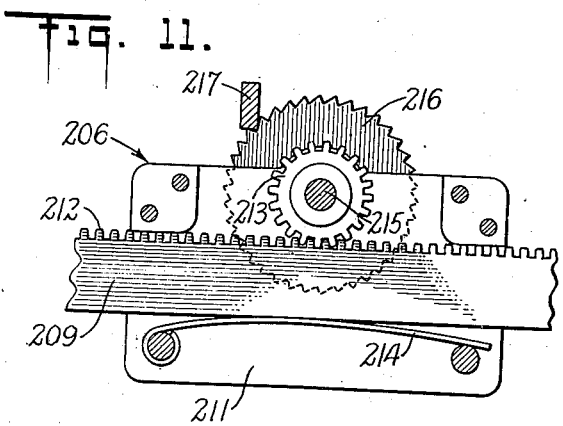
INVENTOR
*Frederick Franz*
BY
*Blair, Curtis, Dunne & Hayward*
ATTORNEYS Oct. 21, 1941.   F. FRANZ   2,259,745
COMMERCIAL PHONOGRAPH
Filed Aug. 1, 1939   13 Sheets-Sheet 10

INVENTOR
Frederick Franz
BY
Blair, Curtis, Dummot Hayward
ATTORNEYS

Oct. 21, 1941.    F. FRANZ    2,259,745
COMMERCIAL PHONOGRAPH
Filed Aug. 1, 1939    13 Sheets-Sheet 11

INVENTOR
Frederick Franz
BY
Blair, Curtis, Dunne + Hayward
ATTORNEYS

Oct. 21, 1941.　　　　　F. FRANZ　　　　　2,259,745
COMMERCIAL PHONOGRAPH
Filed Aug. 1, 1939　　　　13 Sheets-Sheet 12
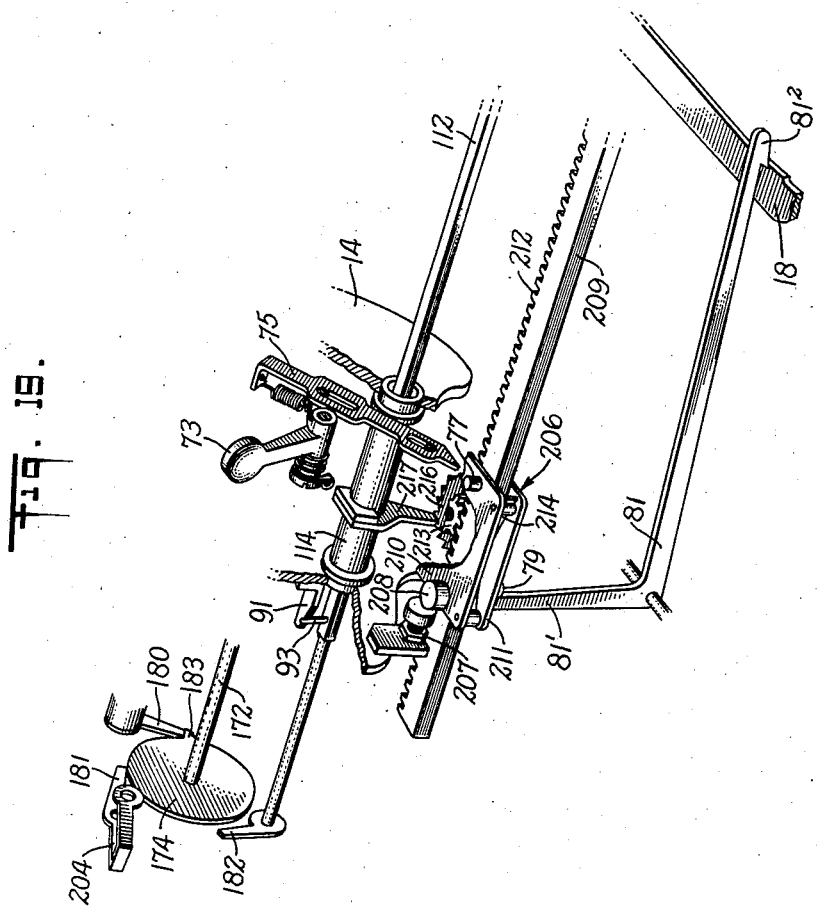
INVENTOR
*Frederick Franz*
BY
*Blair, Curtis, Dunne + Hayward*
ATTORNEYS Oct. 21, 1941.    F. FRANZ    2,259,745
COMMERCIAL PHONOGRAPH
Filed Aug. 1, 1939    13 Sheets-Sheet 13

INVENTOR
Frederick Franz
BY
Blair, Curtis, Dunne + Hayward
ATTORNEYS

Patented Oct. 21, 1941

2,259,745

UNITED STATES PATENT OFFICE 2,259,745

COMMERCIAL PHONOGRAPH

Frederick Franz, New Haven, Conn., assignor to Dictaphone Corporation, New York, N. Y., a corporation of New York Application August 1, 1939, Serial No. 287,692

12 Claims. (Cl. 274—17)

Phonographs designed for both recording and reproducing dictation are now generally so constructed and arranged that the carriage for the recording and reproducing mechanism may at any time be manually moved backwards relatively to its direction of travel with respect to the record tablet while recording, so as to enable the dictator to reproduce previously recorded matter. When a dictator, using such a phonograph for recording dictation, desires to reproduce previously dictated matter, it is necessary first, to manually readjust the recording and reproducing mechanism to neutral position; second, to move the carriage backwardly along the record tablet a distance depending upon the amount of matter to be reproduced; and third, to set the recording and reproducing mechanism in reproducing position. The apparatus is then in condition for reproducing and the dictator may listen to the recorded matter.

When the reproduction of such matter has been completed and it is desired to dictate further, it is necessary for the dictator to again manipulate the recording and reproducing mechanism to return it to the recording position. Such manipulations incident to a repeating operation in the normal use of dictating machines are distracting, in addition to requiring considerable of the dictator's time. Dictators may often neglect to recondition the recording and reproducing mechanism for recording, after completing reproduction, and in consequence may proceed to dictate while the reproducing stylus remains in engagement with the record tablet with the result that no recording is obtained.

A dictating machine disclosed in U. S. Patent No. 2,152,585, provides mechanisms and controls therefor adapted to make some or all of these operations in themselves more or less automatic, some stages in the control of the mechanism from recording to backspacing, then to reproducing, and finally again to recording condition, being designed to follow one another in an automatic manner. In that machine a microphone element serves both as a receiver and transmitter, and also a single electrical translation device or sound box serves both for recording and reproducing operations. Magnetically operating remote control means were provided for changing the drive of the machine from a condition providing advance movement for recording to one providing a backward movement, during the operation of which control means the recording and reproducing styli are shifted from recording to reproducing position in relation both to the record on the mandrel and to the electro-magnetic sound box. At the end of the backspacing movement it is further possible by the operation of a magnetically operating start-and-stop control to cause the carriage again to advance, with the reproducing stylus in operative relation to the record.

In order that at the end of reproducing, the sound box may automatically be reconditioned for recording, an advance slide or marker was provided which, normally travelling along with the carriage during its recording movement, is left behind to mark the point of farthest advance of the carriage when the latter is backspaced preliminary to the reproduction of recorded matter. This advance slide, when again picked up by the carriage in its reproducing advance movement, acts upon certain machine elements automatically to change the sound box and styli from reproducing to recording condition.

The machine disclosed herein is a recording and reproducing phonograph, in general resembling the machine of the said patent in respect to the automatic features of control, but embodying specifically different mechanisms for effecting the automatic control of the recorder-reproducer head in relation to the recording, backspacing and reproducing functions of the machine. An acoustic diaphragm mounted in a sound box or head of known type is employed to translate sound vibrations into mechanical energy for the purpose of causing a recording stylus to cut a sound track upon a cylindrical record blank; and to enable a reproducing stylus to effect a reproduction of said sound waves when made to trace the previously made sound track. It will be understood, however, since the invention claimed herein relates more particularly to the control of the sound box or head, that such control may be extended to cover the operation of electric or electromagnetic recording and reproducing devices without departing from the spirit of the invention. The controls herein are all mechanical, but the invention is not necessarily limited to mechanical controls since other means, such as magnets and relays, may be substituted for or added to some of the present control devices and still remain within the scope of the invention.

One of the objects of the invention is to provide a machine of the character described which is practical and highly efficient. Another object is to provide a machine of the above character which is of simple and compact construction. Another object is to provide improved mechanisms for effecting forward spacing and backspacing of a recorder-reproducer head in relation to a record cylinder; automatically and surely to change the sound box from recording to a neutral condition wherein both the recording and reproducing styli are held out of contact with the record cylinder coincident with the operation of the control for effecting backspacing; automatically and with certainty to change the sound box from neutral to its reproducing condition wherein the reproducing stylus is in contact with the record cylinder when, at the end of a backspacing operation, a control is actuated to effect the advance of the sound box for the reproduction of previously recorded matter; and automatically and certainly to change the sound box from its reproducing condition to recording condition when the reproducing stylus has traveled to the end of the previously made sound track.

Other objects will be in part obvious and in part pointed out hereinafter.

The invention accordingly consists in the features of construction, combinations of elements, and arrangements of parts as will be exemplified in the structure to be hereinafter described and the scope of the application of which will be indicated in the following claims.

In the accompanying drawings, in which is shown one of the various possible embodiments of this invention—

Fig. 8 is a longitudinal section through the machine, taken substantially on line 8—8 of Fig. 2;

Fig. 9 is a cross-section through the carriage which supports the recording-reproducing head, taken on line 9—9 of Fig. 3;

Fig. 10 is a section through the carriage, taken substantially on line 10—10 of Fig. 9;

Fig. 11 is a section through the farthest advance indicating device or marker, taken on line 11—11 of Fig. 9;

Fig. 14 is a fragmentary view showing the electric switch which controls the circuit of the machine motor and part of its operating mechanism;

Fig. 15 is a section on line 15—15 of Fig. 14;

Figure 20:
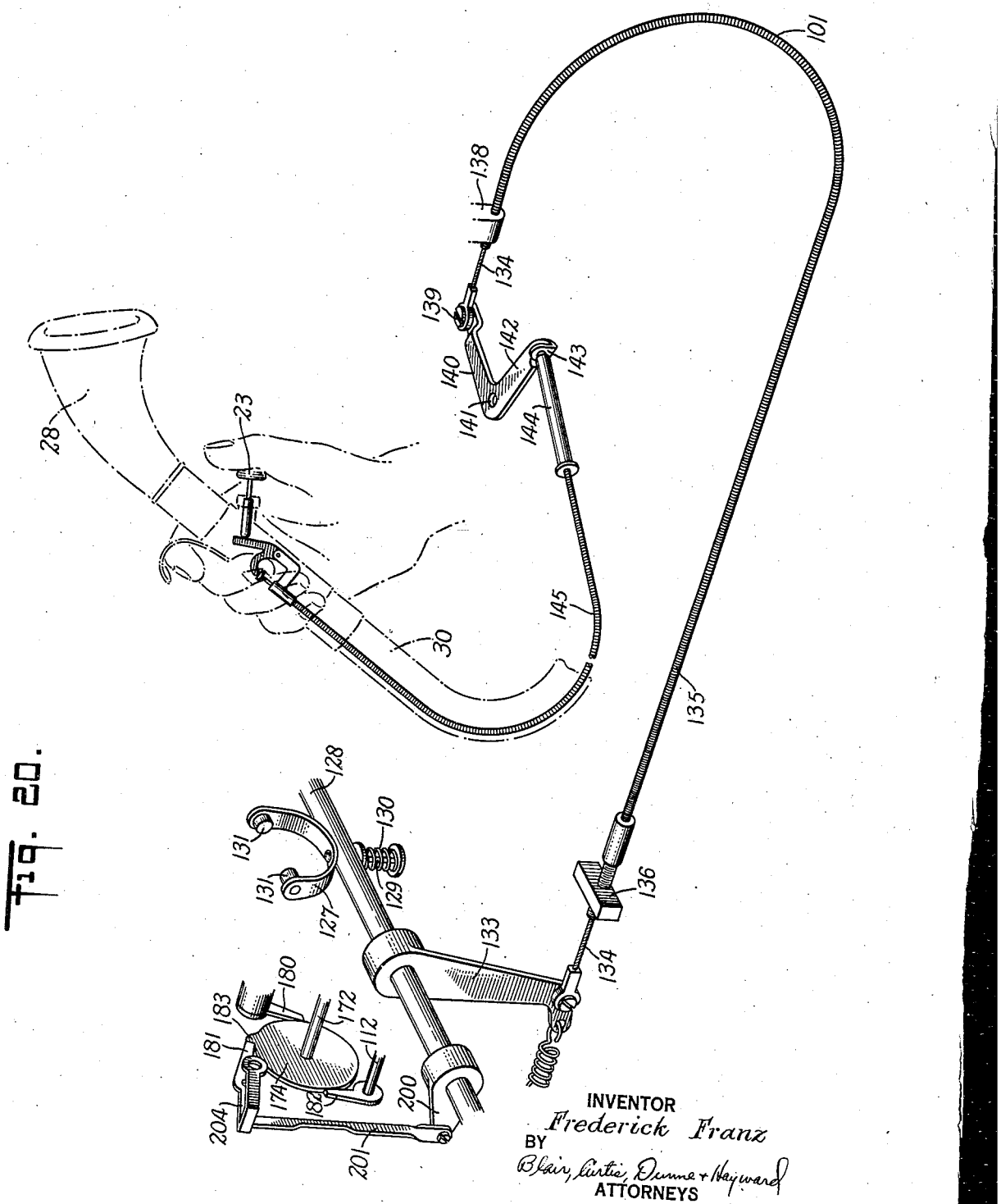

Fig. 19 is a diagrammatic perspective view showing the marker for indicating the farthest advance position of the carriage in operative relation to the carriage but after the carriage and advance marker have been returned to their initial position at the inner end of the record cylinder in which position a record ejector is released to permit the removal of the record cylinder from the mandrel; and Fig. 20 is a diagrammatic perspective view showing how the neutral-position stop pawl is released by the Bowden wire operated by a thumb button located on the mouthpiece of the sound tube leading to the recorder-reproducer head. This figure also shows the connection between said Bowden wire and the yoke for shifting a clutch adapted to effect rotation of the mandrel shaft.

Similar reference characters refer to similar parts throughout the different views of the drawings.

Figure 1:
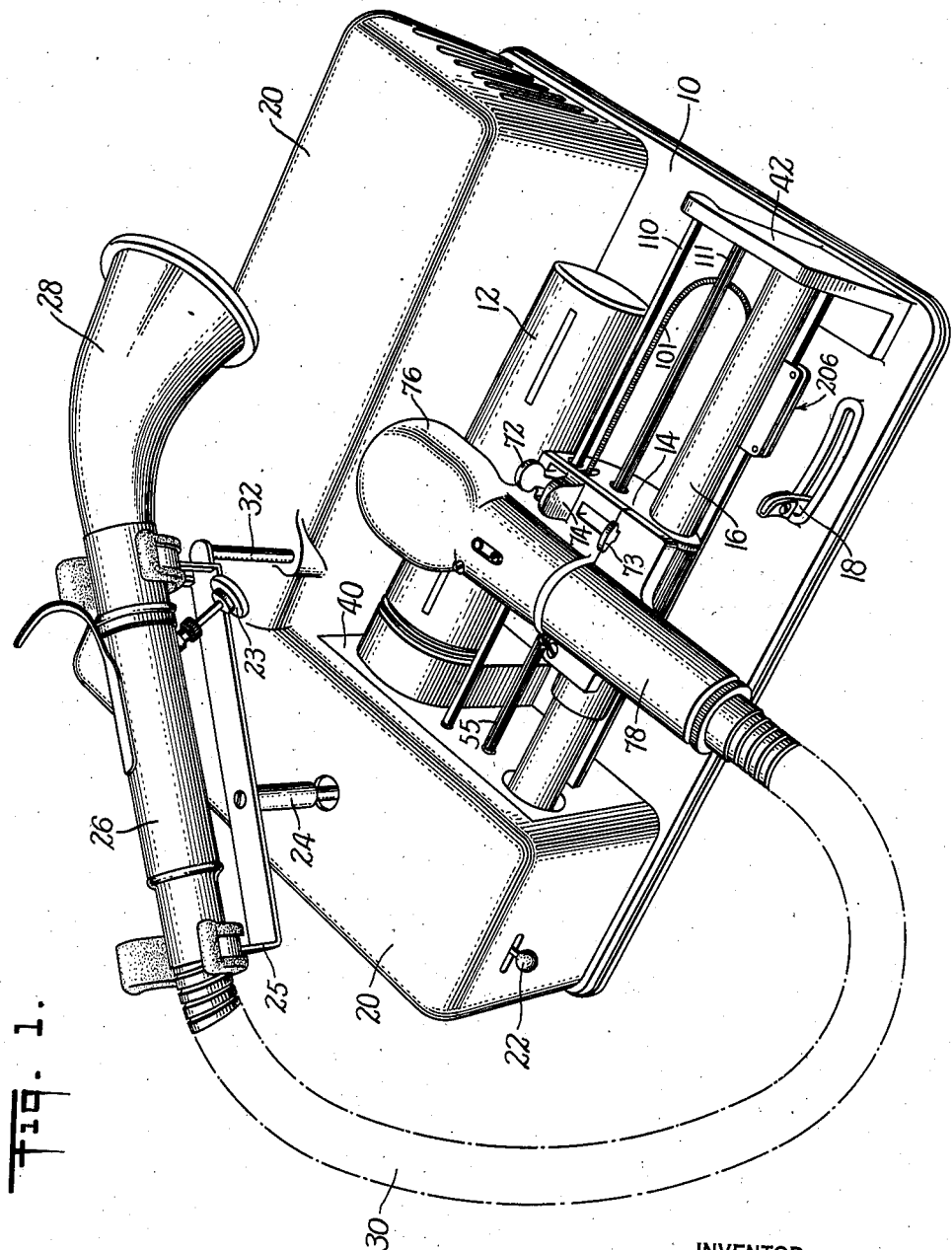
Fig. 1 is a perspective view of a commercial phonograph or dictating machine embodying the principles of the present invention.

Referring to the drawings, and first to Fig. 1, it will be seen that the machine comprises a base plate 10 upon which is mounted a rotatable mandrel 12. A carriage 14 for traversing a sound box longitudinally of a record cylinder mounted on the mandrel 12, is slidably supported by a carriage rod 16. Projecting upwardly through a slot in the base plate extends a lever 18 connected with the record ejecting mechanism, to be more fully described hereinafter. The driving mechanisms and devices are all located beneath an L-shaped mask or cover 20 at the left and rear portions of the base plate. Projecting forwardly through a slot in the cover 20 is the rounded head 22 of a backspace lever 159 by means of which automatic backspacing of the carriage is effected. Extending upwardly through an opening in said cover is a reciprocatory vertical shaft 24 having attached at its upper end a cradle 25 for supporting the mouthpiece 28 of the speaking tube 30 which, during recording, receives sound waves from the mouth of the operator and transmits them to the recording head. A rod 32, depending from one end of the cradle, passes through an opening in the top of the cover 20 and serves to prevent undesired movement of the shaft 24 about its axis.

*Carriage and sound box*

Figure 2:
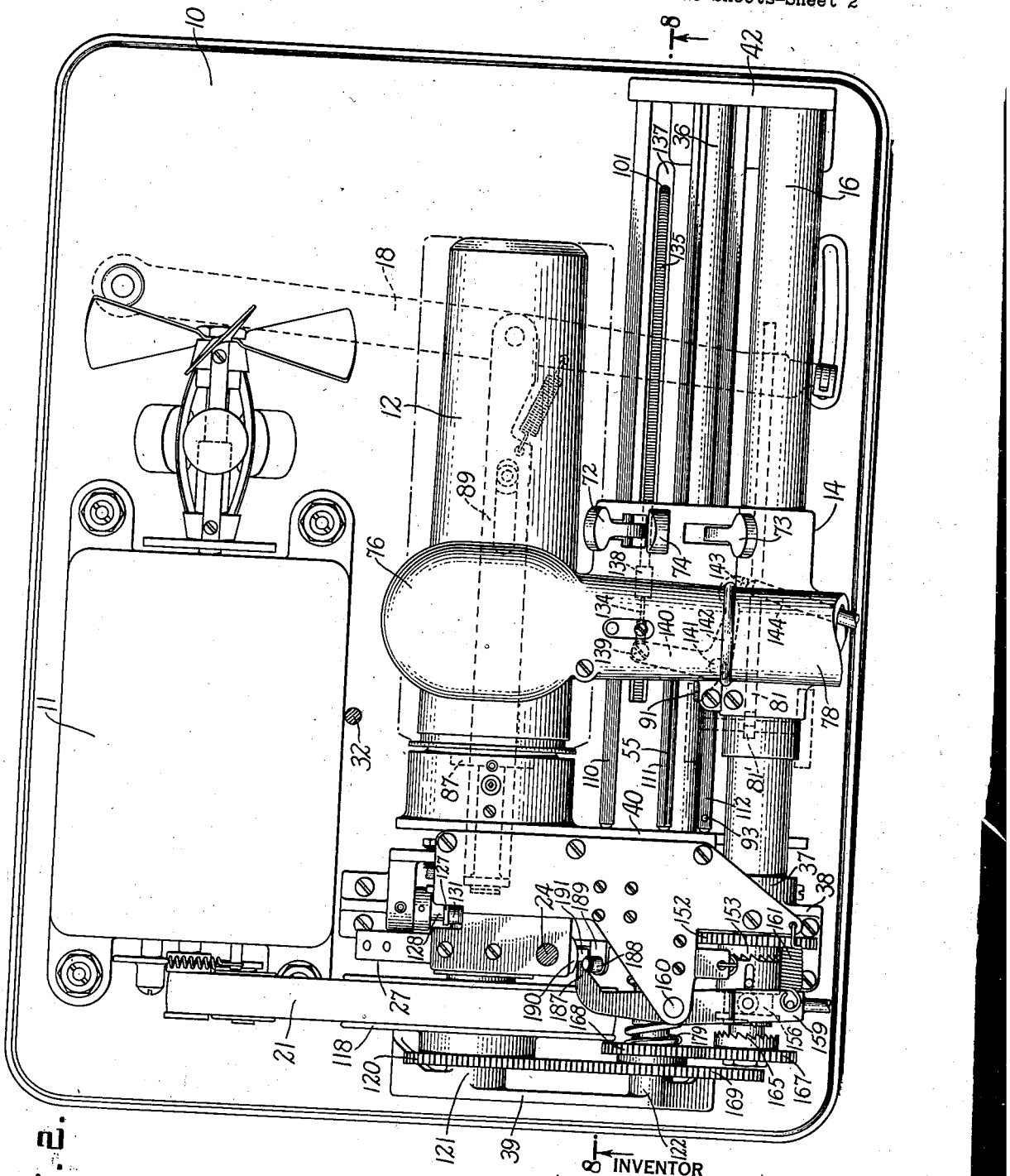
Fig. 2 is a plan view of the same with the mask or cover removed.
Figure 3:
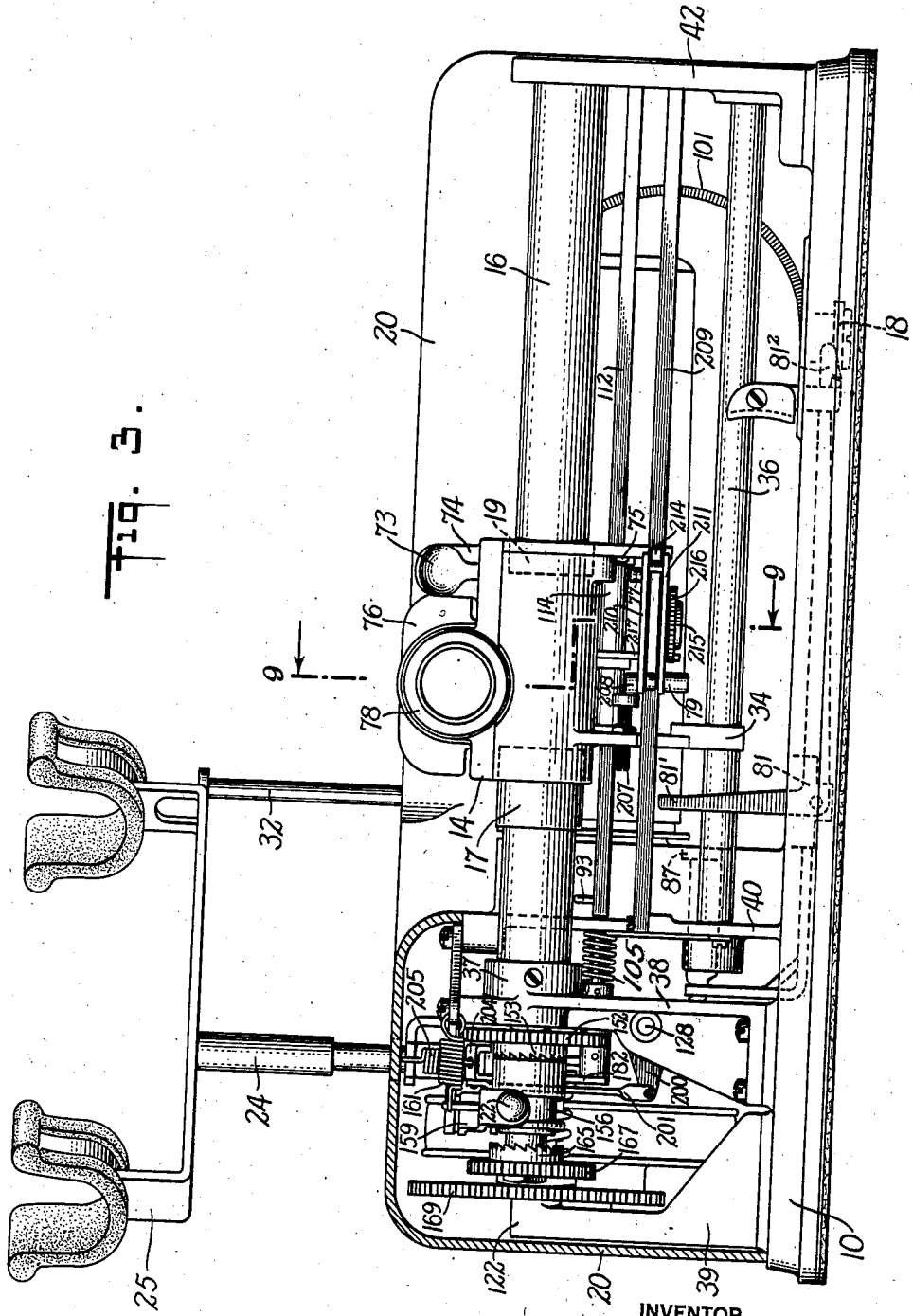
Fig. 3 is a front elevation with the front of the cover removed.
Figure 4:
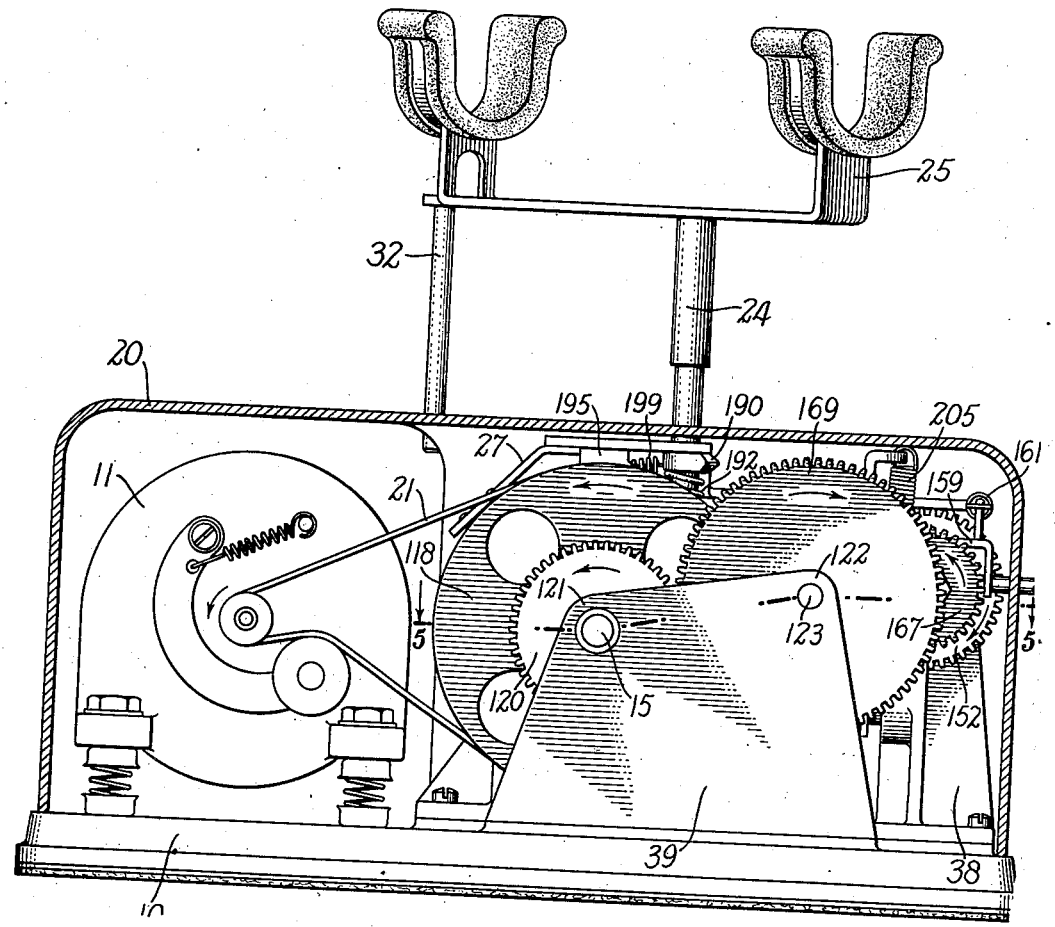
Fig. 4 is a left end elevation of the machine as seen in Fig. 3, with the left side of the cover removed.
Figure 5:
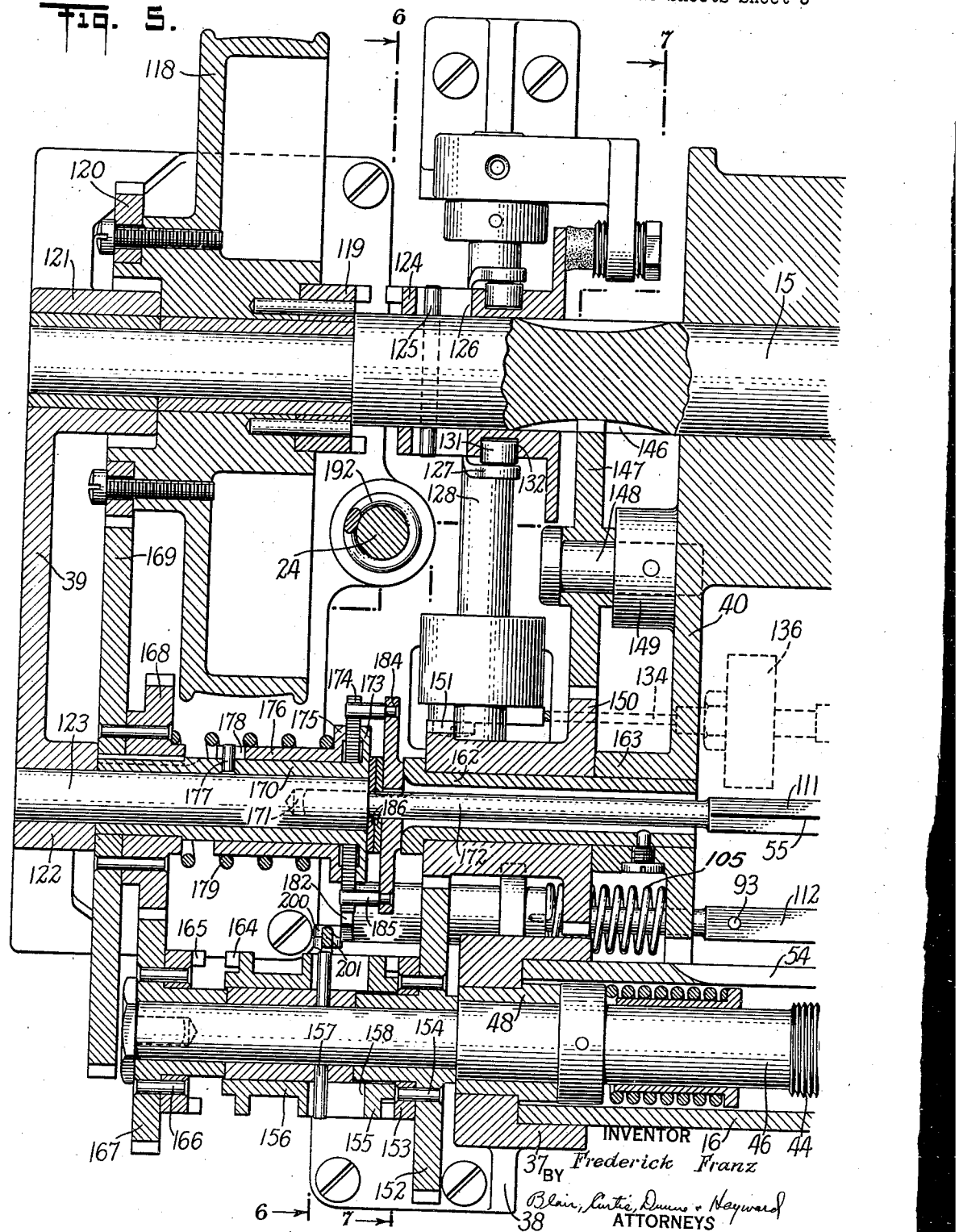
Fig. 5 is a cross-section taken substantially upon section line 5—5 of Fig. 4.

Referring to Figs. 1, 2 and 3, the sound box carriage 14 will be seen to be slidably mounted upon the carriage rod 16 and also to have a downward extension 34 slidably engaging a lower carriage rod 36. Carriage rod 16 is supported at its left end in a bearing 37 formed in a standard 38 secured to the base plate 10. Carriage rod 36 is supported at its left end in a standard 40 also rising from the base plate 10. At their right ends these two rods are supported by a standard 42 rising from the base plate at the extreme right end of the machine. The carriage feed rod 16 is hollow and surrounds a carriage feed screw 44 which, extending longitudinally of the machine within said carriage rod, is rotatably supported at its right end in the standard 42. At its left end the feed screw terminates in a feed screw shaft 46 (see Fig. 5) journaled in a bearing 48 supported by the standard 38. A reduced portion of said shaft extending further to the left will be referred to later. The carriage is slidably supported on the carriage rod 16 by means of two spaced bushings 17 and 19 (see Figs. 3, 12 and 13).

Figure 12:
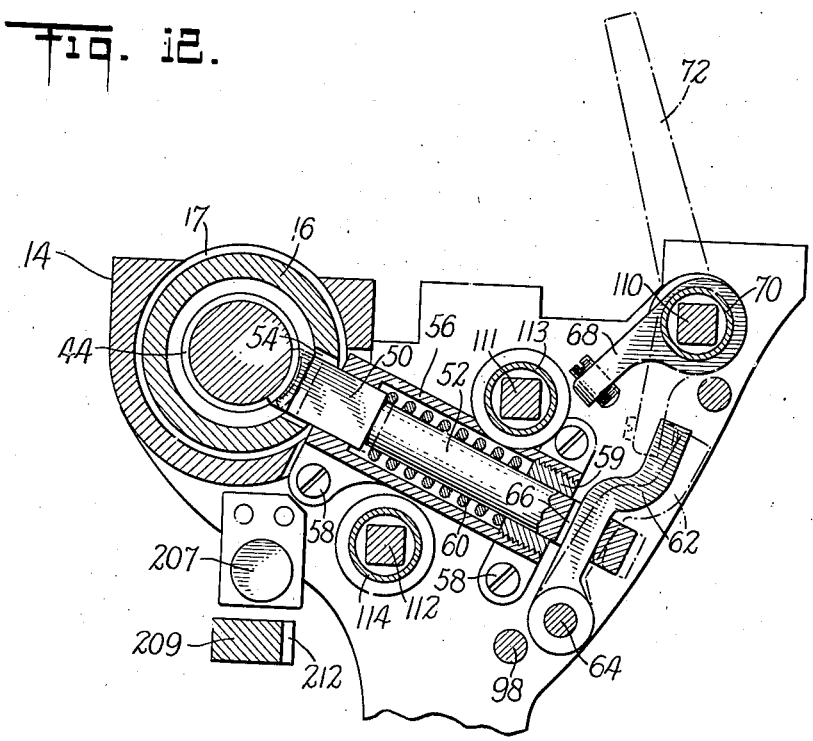
Fig. 12 is a section through a portion of the carriage on line 12—12 of Fig. 10.
Figure 13:
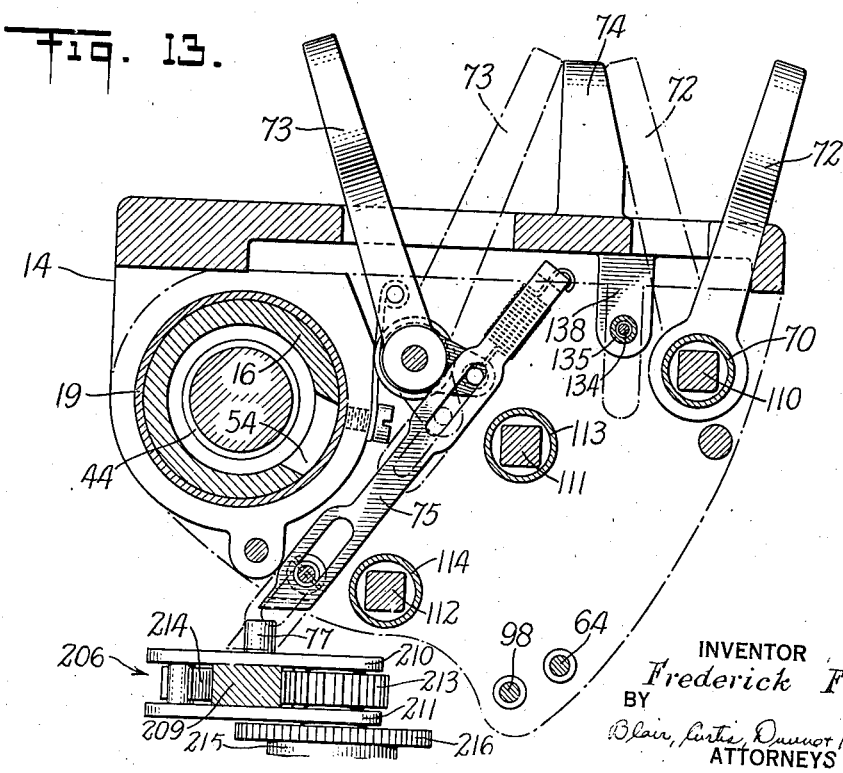
Fig. 13 is a section through the carriage, taken on line 13—13 of Fig. 10.

A feed nut 50, best seen in Fig. 12, mounted upon the inner end of a reciprocatory rod 52, passes through a slot 54 extending substantially the full length of the carriage rod 16 into engagement with the threads of the feed screw. The feed nut 50 and rod 52 are mounted for endwise movement in a casing 56 secured to the inner surface of the left side plate of the carriage 14, as by means of screws 58. Encased within the housing 56 and surrounding the rod 52 is a coil spring 60, engaging at one end a shoulder on the feed nut and at the other end a bushing 59 threaded into the rear end of the casing 56, which spring normally tends to press the feed nut into engagement with the feed screw threads. When it is desired to move the carriage by hand to a back-spaced position, the feed nut may be released by rocking a lever 62 pivotally mounted on the carriage, as at 64, which lever passing through an opening 66 in the rod 52 has its free end disposed in operative relation to a rocker arm 68. Arm 68 is mounted at one end of a sleeve 70 rotatable in bearings in the side walls of the carriage. A manually operable backspace lever 72 is fixed at the opposite end of the sleeve 70 and projects upwardly through the top of the carriage. Lever 72 is shown in its normal position in Fig. 13, the feed nut being in engagement with the feed screw. Its manipulated position is indicated by dot-and-dash lines in Figs. 12 and 13. In Fig. 12 the dot-and-dash lines show the feed nut in its retracted, or inoperative position. By reference to Figs. 1 and 2, it will be seen that this lever 72 may be brought to its manipulated position, in contact with an abutment 74, by grasping the said abutment and lever 72 between the thumb and first finger of the operator's right hand and squeezing the two together.

Figure 16:
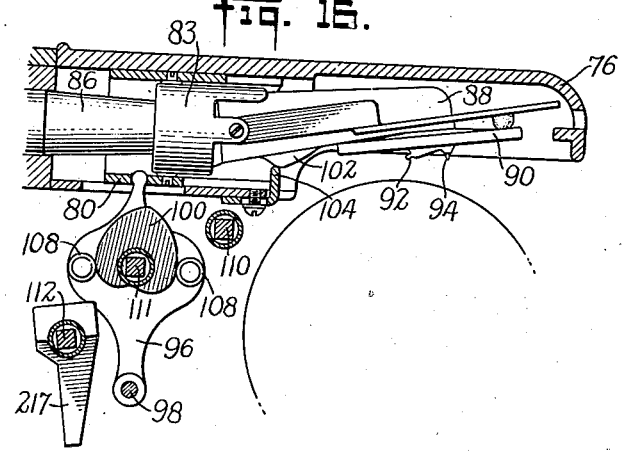
Fig. 16 is a fragmentary section of a portion of the carriage, showing the recorder-reproducer head in neutral position and showing a cross-section of the head or sound box position-setting shaft and the cam through which it functions to change the condition of the sound box, the cam being in the appropriate position for a neutral condition of the sound box.
Figure 17:
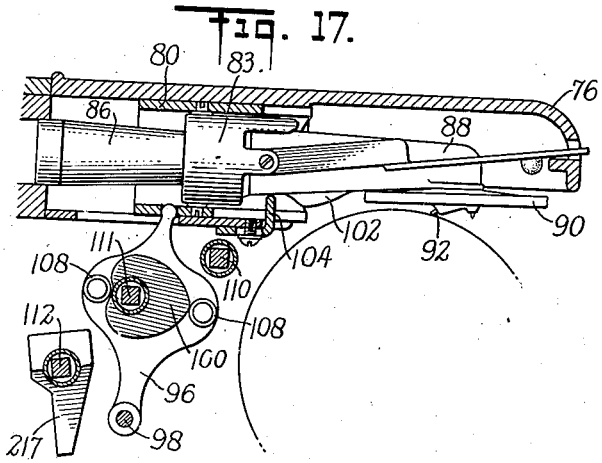
Fig. 17 and Fig. 17a are views similar to Figs. 16 and 16a, except that the parts are shown in the proper position to condition the sound box for recording.
Figure 18:
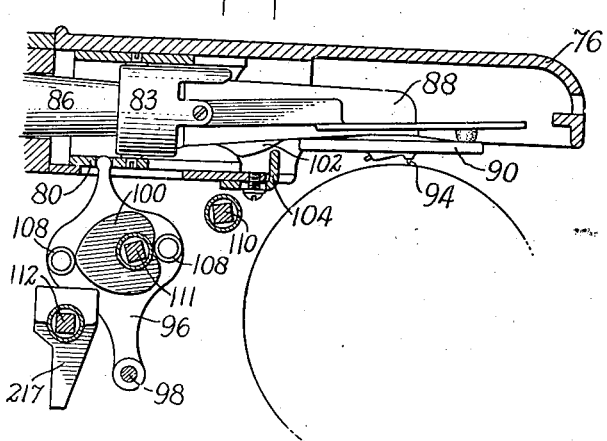
Fig. 18 and Fig. 18a are views similar to those just preceding, but showing the parts in the position they would occupy when the machine is conditioned for reproducing.

Referring again to Fig. 9, the recorder-reproducer head will be seen to be of the well known type more fully described in U. S. Patent 1,989,783. This device is mounted in the upper part of the carriage, a portion of which forms a cover 76 overlying and surrounding the sides of the recording-reproducing mechanism. This cover at its forward end comprises a casing 78 within which is mounted a slide 80. Within this slide is pivotally mounted, as by the pivots 82, a sleeve 83 which by means of pivots 85 supports the ball-and-socket junction 84 of a telescoping tube 86 and a tone tube 88. At the rear end of the latter is mounted the sound box 90 provided with a recording stylus 92 and a reproducing stylus 94. The slide 80 is operatively connected with the cylindrical upper end of a lever 96, the latter pivotally mounted in the carriage as by means of a pin 98. This lever is adapted to be swung backwardly and forwardly between extreme positions by the rotation of a heart-shaped cam 100, as will be more fully described hereinafter. It will be understood that as the heart-shaped cam rotates progressively to the various positions shown in Figs. 16, 17 and 18, the slide 80 will move forward or back, as the case may be, to bring the sound box to its recording, neutral and reproducing positions.

In Fig. 9, the sound box is shown in neutral condition. Therefore, a swing to the left of the cam lever 96 will move the sound box into correct position for engaging the reproducing stylus 94 with the record, while at the same time the tone arm is permitted to swing down to bring said stylus into engagement with the record. A movement of the cam lever 96 toward the right, as seen in Fig. 9, will permit the recording stylus 92 to assume its proper position and to engage the record cylinder.

The raising and lowering of the sound box is accomplished by means of a cam 102 depending from the under side of the tone arm which rides over an upturned plate 104 adjustably secured, as by means of the screw 106, to the under side of the housing 78. As the tone tube is moved backward and forward in response to movement of the lever 96, the sound box is lifted to its neutral position each time the high point of the cam rides over the plate 104, after which, further movement brings the appropriate stylus into contact with the cylinder in a gradual, gentle manner. The cam lever 96 supports a pair of spaced rollers 108 which, in all positions of the heart-shaped cam, ride upon the cam surface at points diametrically opposing one another.

The control mechanism for the sound box or head comprises three squared shafts 110, 111 and 112, best seen in Figs. 9, 10, 12 and 13. These shafts extend longitudinally of the frame, and their manner of mounting and other specific features will be referred to later. It should be noted here, however, that each of these shafts passes through a sleeve pivotally mounted in the side walls of the carriage. The sleeves are all mounted alike, and since in Fig. 10 the sleeve surrounding the shaft 112 is shown in section, a description of that sleeve will be made to suffice for all three sleeves. One of these sleeves is the sleeve 70 already referred to in connection with the manual backspace lever 72. The sleeve surrounding the shaft 111 is indicated by the number 113, and the sleeve surrounding shaft 112 is indicated by the number 114.

Referring specifically to the construction and mounting of sleeve 114, it will be seen that it is of greater diameter internally than the squared shaft it surrounds, so that the shaft does not engage therewith except at the left end where the sleeve 114 is closed as shown at 115. This closure at 115 is provided with a squared opening slidably engaging the shaft 112. The mounting for sleeve 114 comprises a pair of bearing members 116, 117 in the form of bushings mounted opposite one another in the side walls of the carriage. Having in mind this construction, it will be obvious that an oscillation of any one of these sleeves will impart a similar oscillation to the squared shaft which it surrounds, or, vice versa, an oscillation of any one of these shafts will effect a corresponding oscillation of the sleeve surrounding it; and such transmission of movement from shaft to sleeve or from sleeve to shaft may take place in any position of the carriage along its path of travel.

The heart-shaped cam 100 referred to above is rigidly mounted upon the sleeve 113 and receives its motion from the sleeve 113 through a step-by-step rotation of the shaft 111. This shaft may be termed the recorder-reproducer head position setting shaft or, more briefly, the head setting shaft. Shaft 110 may be called the backspace control or recording position stop shaft. Its operation and function will be described later. Shaft 112 will be referred to hereinafter as the reproducing position stop shaft. Each of these shafts plays its part in effecting automatic operation of the machine.

*Mandrel and feed screw drive mechanism*

Refer to Figs. 2, 3, 4, 5, 6, 7 and 8. Power to cause rotation of the mandrel 12 and forward rotation of the feed screw 44 to advance the carriage while the recorder-reproducer head is either recording or reproducing, is received from a motor 11, occupying a position at the rear and toward the left side of the base plate, which is coupled to the mandrel shaft 15 by means of a belt 21 driving a loose pulley 118. This pulley carries on its right face a clutch element 119 and upon its left face a spur gear pinion 120. The mandrel shaft 15 is supported at its left end in a bearing 121 carried by a standard 39 uprising from the base plate adjacent the left end thereof. This standard also provides a bearing 122 for a stud shaft 123.

A clutch sleeve 124 adapted to cooperate with the clutch member 119 is slidably mounted upon the mandrel shaft 15 but is prevented from rotating in relation thereto by means of a pin 125 which passes through the shaft 15 and slotted portions 126 in the sleeve. The clutch sleeve may be moved into and out of engagement with the clutch member 119 by means of a yoke 127, best seen in Figs. 5, 6 and 8, which is mounted upon an oscillatable cross-shaft 128 by passing the stem 129 of the yoke through the shaft and maintaining it in the position indicated in the drawings by means of a spring 130 interposed between the shaft 128 and the head of the stem 129. This stem may be a screw bolt or other suitable member. The yoke 127 is provided with opposed rollers 131 which track a groove 132 in the clutch sleeve, whereby oscillation of the shaft 128 effects reciprocatory movement of the clutch sleeve either into or out of engagement with the clutch member 119. Shaft 128 is rocked by means of a rocker arm 133 to which is attached a bowden wire 101 comprising an inner member 134 and outer member 135, the latter being anchored as at 136 to a lug extending downwardly from the base plate (see Fig. 8).

The bowden wire, comprising the inner and outer members 134 and 135, passes through a channel 137 extending longitudinally of the frame and from the under side to the upper side of the base plate and is then curved upwardly and to the left where the outer member 135 is anchored in the lug 138 on the carriage, and the inner member 134 is secured as by means of the screw 139 (see Fig. 2) to one arm of a bell crank lever 140. Bell crank lever 140 is pivoted at 141 within the carriage structure and is provided at the end of its other arm 142 with an abutment member 143 engageable by plunger 144 (Figs. 2 and 9) slidably mounted in a passageway formed in the sound box casing 78. This plunger is secured to the outer member of a second bowden wire 145 whose inner member is anchored to the carriage and to the handle of the sound tube in a well known manner, as indicated in Fig. 20. At the outer end of the outer member is a thumb button 23 operable to rock the bell crank lever 140 in a counterclockwise direction, as seen in Fig. 2, effecting through the medium of the bowden wire 134, 135 movement of the rocker arm 133 and oscillation of rock shaft 128 in the direction indicated by the arrow, that is, a counterclockwise direction as seen in Fig. 8. This rocking of the rock shaft 128 forces the clutch sleeve 124 into engagement with the pulley clutch member 119, and mandrel rotation ensues. Upon release of the starting button 23 the parts are returned to inoperative position by reaction of spring 103 attached to lever 133.

The forward drive of the feed screw for advancing the carriage during recording of reproducing is effected through a train of gears whenever the mandrel clutch is engaged with the driving pulley. This train of gears comprises a pinion 146 cut in the mandrel shaft 15, which engages and drives a spur gear 147 rotatably mounted upon a stud 148 immovably supported within a boss 149 carried by the standard 40. Gear 147 meshes with a gear 150 formed integrally with a gear 151 which latter in turn meshes with a gear 152 loosely mounted on the feed screw shaft 46. This gear 152 carries on its hub, adjacent the left face of the gear, a clutch member 153 secured to the gear 152 as by means of pins 154. This clutch member is normally in engagement with a cooperating clutch member 155 carried at the right end of a reversing clutch sleeve 156 which is mounted for endwise movement upon the screw shaft 46 but is made to rotate therewith by means of a pin 157 which cooperates with slots 158 in the sleeve 156.

Operation of the clutch sleeve 156 is effected by hand manipulation of a backspace lever 159 (see Fig. 2) pivoted at 160 in members of the machine frame and normally held by means of a spring 161 in a position to effect engagement of the clutch sleeve 156 with the gear 152 and so accomplish the forward drive of the carriage. At the forward end of this lever 159 is the rounded head or finger piece 22, referred to at the beginning of this description. The integral gears 150 and 151 are rotatably mounted upon a hollow sleeve 162 supported in a boss 163 extending to the left from the standard 40, as will clearly appear by reference to Fig. 5. This sleeve is coaxial with the stud shaft 123 referred to above.

The reverse rotation of the feed screw 44 to effect a backward movement of the carriage while the sound box is in neutral condition, takes place through operation of the backspace lever 159 to engage a clutch member 164 formed on the left end of the clutch sleeve 156, with a clutch member 165, carried as by means of pins 166, by a gear 167 meshing with a gear 168 secured to or formed integrally with a gear 169. Gear 169 meshes in turn with gear 120 which, as was mentioned above, is secured to the pulley 118. Thus this train of back gearing rotates at all times when the motor is in operation but is effective to drive the feed screw in its direction for backward carriage movement only when the clutch member 164 of the reversing clutch sleeve 156 is brought into engagement with the clutch member 165 by operation of the backspace lever 159.

Gears 168, 169 are jointly keyed or otherwise fixed to a sleeve 170, rotatable upon the stud shaft 123, the latter being bored as at 171 to provide a bearing for the round left end extension 172 of the square head set shaft 111, referred to above.

The drive of the head set shaft 111 which controls the shifting of the recorder-reproducer head progressively from one to another of its set positions, may now be described. As stated above, gears 168, 169 are integral and are fixed upon the sleeve 170. This sleeve has a running fit on the stud shaft 123 and has a flange 173 on its right end against which a friction disc 174 is pressed by a second flange 175. Flange 175 is formed upon a sleeve 176 slidable within limits along the sleeve 170 and rotatable therewith by the engagement of a pin 177 carried by the sleeve 170 which engages the walls of a slot 178 in the sleeve 176. The flange 175 frictionally engages the friction disc 174 and presses it against the flange 173 because of the reaction of a spring 179. This spring surrounds sleeve 176, engaging at one end gear 168 and at the other end the flange 175.

Figure 6:
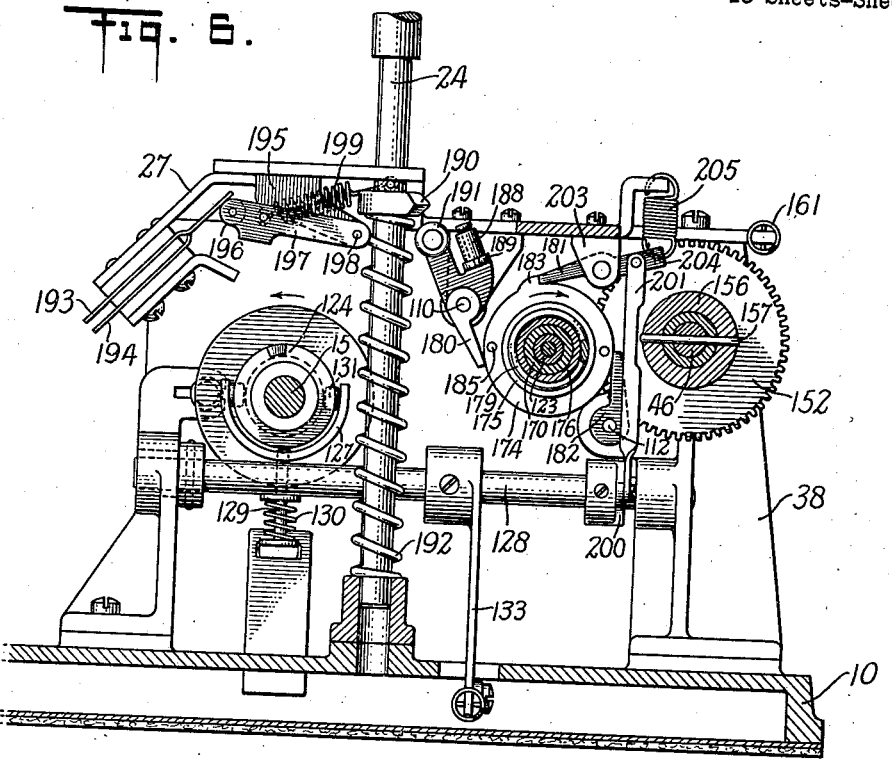
Fig. 6 is a section taken substantially on line 6—6 of Fig. 5.
Figure 7:
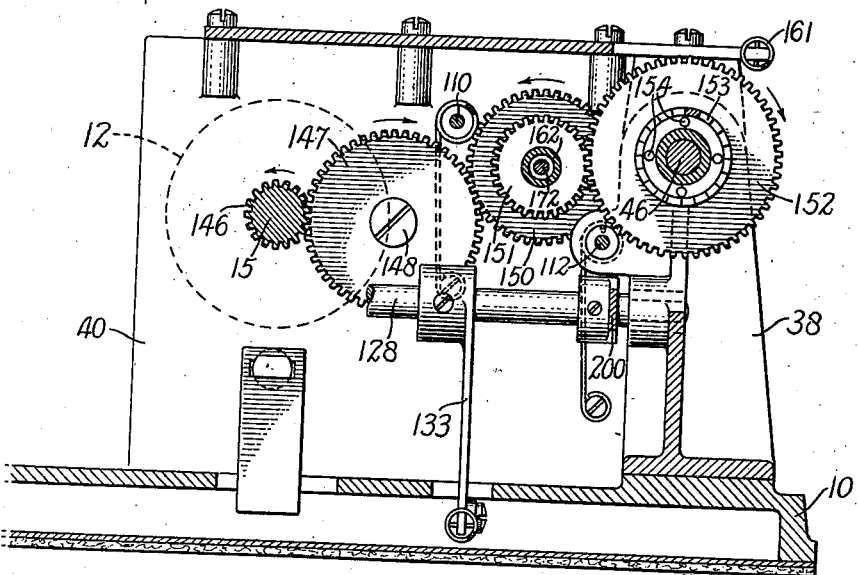
Fig. 7 is a cross-section taken substantially on line 7—7 of Fig. 5.
Figure 16A:
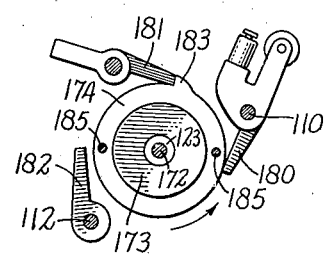
Fig. 16a is a fragmentary end elevation of the sound box setting shaft and the friction disc which drives it together with a plurality of pawls adapted to stop rotation of the said disc and said shaft in neutral, recording or reproducing position. As shown in this figure, the disc is held in its neutral position by means of the neutral pawl.
Figure 17A:
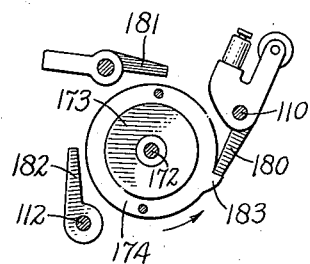
Figure 18A:
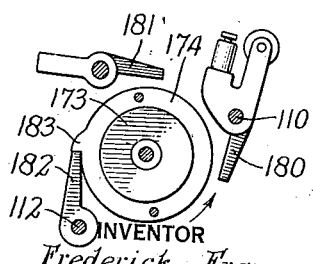

Thus it will be observed that so long as the motor is in operation the friction disc 174 is being frictionally urged to rotate in a clockwise direction as seen in Fig. 6 or in a counterclockwise direction as seen in Figs. 16a, 17a and 18a. However, this disc is normally held against rotation through the engagement of one or another of the three pawls 180, 181 and 182, with a detent or ratchet tooth 183 formed upon the periphery of the friction disc. Thus the friction disc may rotate only when released by the lifting of the pawl which at the time is holding the disc in a set position by engagement with the detent 183. Rotation of the friction disc is transmitted to the head-set shaft 111 which, as stated above, is mounted coaxially with the stud shaft 123, by the coupling of the friction disc 174 with a flange 184 fixedily mounted upon the head-set shaft and held relatively immovable with respect to the friction disc 174 by means of the pins 185. Suitable washers, such as 186, are disposed between the end of the sleeve 170 and the flange 184 to take up the thrust. The opposite surface of the flange 184 engages the flanged end of the above mentioned hollow bushing 162 through which the head set shaft extends.

It will be seen from the above that the square head-set shaft will be turned a portion of a revolution each time one of the detent engaging pawls is lifted, that is, it will rotate until the detent engages the succeeding pawl in its path of travel.

As said above, the head set shaft, non-rotatably mounted in the sleeve 113 (Fig. 10) will be effective to cause movement of the heart-shaped cam 100 and thus a conditioning movement of the recorder-reproducer head whenever such pawl release occurs, regardless of the lengthwise position of the carriage at any instant relative to the mandrel. Pawl 180, normally biased against the friction disc by spring 109 operatively related to shaft 110, may be regarded as the recording position stop pawl, since it always acts to detain the friction disc in such a position that the recorder-reproducer head will occupy its recording position with its recording stylus engaging the record cylinder. The release of this pawl, as will be more fully explained later, is responsive to operation of the carriage backspace lever 72 which is manipulated when the operator, while recording, desires to place the recorder-reproducer head in neutral position and free the feed nut from the feed screw, all as explained above, in order that he may slide the carriage to any backspace or, in fact, any forward space, position. This pawl is also releasable in response to operation of the automatic backspace control lever 159 when the latter is manipulated to effect automatic backspacing of the carriage through the reverse rotation of the feed screw. This lever 159 (see Fig. 2) is provided rearwardly of the pivot 160 with a nose 187 adapted to cooperate with a cam roller 188 carried by an arm 189 extending upwardly and offset laterally in respect to the recording position stop pawl 180.

It may now be understood that a full throw of the carriage backspace lever 72 will in the first part of its movement cause a slight operation of the recording position control shaft 110 to effect a release of the pawl 180 with the consequent rotation of the squared shaft and friction disc to the position shown in Fig. 16a where the detent 183 is held in a neutral position by engagement with the pawl 181. During the continued movement of the backspace lever 72 the feed nut will be withdrawn from engagement with the feed screw. Thus the carriage may be moved freely in either direction with both styli removed from engagement with the record cylinder.

Operation of the recording position pawl 180 by means of the automatic backspace lever 159 merely moves the pawl sufficiently to release the friction disc and permit movement of the control shaft and the recording head into neutral position. The recording position stop pawl 180 is also operable to shift the recorder-reproducer head from recording to neutral position when a switch 27 in the motor circuit is opened. Of course the friction disc cannot rotate after the motor stops, but when the switch is opened the parts have sufficient momentum to carry the head-set shaft from its recording to its neutral position. This shifting of the head or sound box into neutral and simultaneous opening of the motor circuit is achieved by placing the mouthpiece 26, 28 upon the cradle 25, causing downward movement of the vertical shaft 24 and the release of the recording position stop pawl by engagement of a camming lug 190 carried by said shaft 24 with a roller 191 carried by an arm of the recording position stop pawl 180. The cradle shaft 24 is held in its raised position when not supporting the mouthpiece, by means of a spring 192, which is not sufficiently strong to support the mouthpiece.

The construction and manner of operation of switch 27 will be understood by reference to Figs. 6, 14 and 15. Two resilient contact members 193, 194 are carried in a suitable insulating block in a bracket 195 supported by the standards 38 and 40. These switch contacts, which it will be understood are in the motor circuit, are disposed with their two inner end portions spaced side by side in the same plane in such a position that they may be bridged by a contact member 196 carried at the end of a lever 197 pivoted on a portion of the above mentioned bracket, as by means of the pivot pin 198. When the cradle shaft 24 is in its depressed position, as shown in Fig. 14, the contact 196 is snapped out of engagement with spring contacts 193, 194 by the operation of a spring toggle 199 fastened at one end to the lever 197 on the center line thereof and at the other end to a pin extending laterally from the side of shaft 24. This arrangement also serves to snap the contact 196 into engagement with contacts 193, 194 when the shaft 24 in its upward movement causes the spring 199 to swing across the center line of the lever 197. In Fig. 6 the parts are shown in the close position of the switch, as would be the case when the mouthpiece is removed from the cradle.

The neutral position stop pawl 181 is released by action of the bowden wire when the starting button on the mouthpiece is pressed to throw the mandrel clutch into operation, as hereinbefore described. It will be remembered that depression of the starting button causes oscillation of a cross shaft 128 to effect engagement of the mandrel clutch.

Mounted on the right end of the shaft 128, as seen in Fig. 6, is an arm 200 which is pinned to the shaft to oscillate therewith. A link 201 pivoted to both the arm 200 and to the neutral pawl 181 (see Figs. 3 and 6) causes release of the neutral pawl from the detent 183 when shaft 128 is rocked by the bowden wire for the purpose of starting mandrel rotation and advance drive of the carriage. This pawl, as shown in Fig. 6, is pinned to a bracket 203 carried by one of the frame members, and the rear extension 204 of the neutral pawl, that is, that part of the pawl to which the ink as attached, is normally biased in a raised position by means of a spring 205. Operation of the bowden wire consequently rocks the neutral pawl out of engagement with the detent 183 and permits rotation of the friction disc until the detent comes into engagement with the reproducing stop pawl 182, during which movement the heart-shaped cam moves the recorder-reproducer ahead into the reproducing position with the reproducing stylus in engagement with the record cylinder. Reproduction of recorded matter will now continue if the starting button is held, until the carriage reaches its point of farthest advance during the preceding recording operation, when a farthest advance marker, indicated generally by the reference number 206, is picked up by the carriage and, after a very brief interval of time, effects movement of the shaft 112 to cause a release of the reproducing position stop pawl 182, whereupon the friction disc automatically returns to the recording position and the recorder-reproducer head mechanism is simultaneously brought to the recording position with the recording stylus in engagement with the record cylinder. This mechanism and its manner of operation will now be described.

*Advance marker*

It will be understood that during a period of dictation the carriage moves to the right along its guides. During this movement the marker 206 (see Figs. 3, 9, 11 and 13) is carried along by the carriage through the engagement of a set screw 207 on the carriage with a pin 208 projecting upwardly from the marker. A guide bar 209 slidably supports the marker 206. The latter comprises a pair of spaced plates 210 and 211 disposed above and below the guide bar respectively and suitably fastened to one another. The rear edge of the guide bar 209 provides a rack 212, and rotatably mounted between the marker plates 210 and 211 is a rack pinion 213 whose teeth mesh with those of the rack. A flat spring 214 keeps the marker in operative relation to the rack and provides sufficient friction to retain the marker in its position of rest when the carriage is moved backwardly therefrom. The pinion shaft 215 supports a ratchet wheel 216 beneath the marker bottom plate 211. It will be understood that as the marker is slid along the guide bar by the carriage, the rack will cause rotation of the pinion and consequent rotation of the ratchet wheel 216. Mounted on the sleeve 114 surrounding the squared shaft 112 is a ratchet pawl 217. This pawl makes contact with the teeth of ratchet wheel 216 when the marker is engaged by the carriage for advancement by the carriage. Thus while the carriage and marker advance together toward the right end of the machine the pawl 217 is continually lifted and dropped by succeeding ratchet teeth as the wheel is rotated past the pawl. This motion of the pawl 217 is transmitted to the squared shaft 112 carrying at its left end the reproducer stop pawl 182 normally held in operative relationship to the periphery of the friction disc 174 by spring 105 reacting on shaft 112 (see Fig. 3). Thus it will be seen that as long as the carriage is moving toward the right, in contact with the marker, the repeated lifting of the reproducer stop pawl will permit the friction disc detent 183 to pass through the reproducing position into the recording position where it will be stopped by recording position stop pawl 180.

Should the carriage have been drawn to the left out of contact with the marker, as is the case when back-spacing, the pawl 182 would remain in contact with the friction disc and would prevent the passing of detent 183. The recorder-reproducer head would therefore remain in the reproducing position after release of the neutral position stop pawl by operation of the start-and-stop button, as hereinbefore described. Operation of the start-and-stop button under these conditions starts the carriage moving toward the right with the reproducing stylus in contact with the record. Now when the carriage overtaken the marker the continual movement of pawl 217 will immediately begin, but since a definite movement of pawl 217 is required before pawl 182 passes out of the path of the detent 183, the resultant lag makes is possible for the carriage and marker to move forward together a slight distance before the recorder-reproducer head changes from reproducing to recording. Thus a small safety margin is established between the end of the old and the beginning of the new sound track. This margin may be in the neighborhood of .020''.

In order that the operator may be warned not to dictate before the recorder-reproducer head has changed from reproducing to recording position, there is provided a simple visible signal comprising a stripe 55 of any distinctive color painted in a shallow channel on one of the flat surfaces of the squared shaft 111. The painted side should be selected so as to bring the stripe uppermost and visible only when the recording stylus is in operative position. It will be understood that a signal light or a buzzer may readily be employed in place of the painted stripe for indicating the position of the recorder head, and the operation of such a signal may be controlled by contacts brought together only when the proper side of the squared shaft is uppermost.

When it is desired to change the cylinder at the end of dictation, the operator grasps not the fixed carriage stop 74 and the backspace finger lever 72, as he did when he wished to move the carriage 14 backwardly by hand, leaving the marker 206 in its advance position, but, instead, he grasps the lever 72 and a similar lever 73, the latter extending upwardly through the top plate of the carriage. By bringing these two levers together to the dot-dash positions shown in Fig. 13, the sound box is not only set in its neutral position and the feed nut disengaged from the feed screw, but through the movement of lever 73 the lower end of a slide 75 is projected into the path of a pin 77 which extends upwardly from the top plate of the market. Consequently when the carriage is moved backwardly by hand with levers 72 and 73 pressed together, the advance marker 206 is constrained to return with the carriage to the beginning of the record, that is, to their initial position at the left end of their path of travel. In this position an abutment 79 on the lower side of the marker presses against one leg 81¹ of a bell crank lever 81 pivotally mounted in the base of the machine (Figs. 2 and 3). This raises the hook-shaped end 81² of the bell crank out of interlocking engagement with the record ejecting mechanism. The latter comprises the manually operable lever 18 pivoted on the base of the machine, which is operably connected to the record ejector 87 by means of the long link 89 slidably supported beneath the base. It will therefore be evident that a cylinder cannot be removed from the mandrel by operation of the record ejector unless the carriage and marker have first been returned to their initial position.

When the carriage is manually brought to its extreme left position, preparatory to ejecting a cylinder, sufficient clearance may obtain between the pawl 217 and the face of a ratchet tooth to result in a slight amount of waste space at the beginning of a record before the recorder head comes into recording position. To avoid this undesired space at the beginning of the new cylinder, corresponding to the safety margin provided between new and old recordings, the carriage is provided with a cam 91 (Figs. 2 and 10) which will bear against a pin 93 upstanding from the reproducer stop shaft 112 when the carriage is brought to its left end position, thus oscillating shaft 112 and causing pawl 182 to move out of the path of the detent 183. Hence the friction disc and the parts operated thereby will go immediately into recording position, and dictation may be recorded at the very beginning of a new record cylinder.

From the foregoing, it will be seen that there is herein provided a machine which achieves the objects of this invention, including many practical advantages. The parts are compactly arranged for convenient accessibility, and the machine is convenient to operate and thoroughly practical throughout.

As many possible embodiments may be made of the above invention without departing from the scope thereof, it is to be understood that all matter herein set forth or shown in the accompanying drawings is to be interpreted as illustrative and not in a limiting sense.

I claim:

1. In a dictating machine, in combination, a record support, a recording and reproducing sound box having recording, neutral and reproducing positions relative to the record support, means normally movable and connected to said sound box to shift said sound box from one of said positions to the next thereof in a certain cyclic order, releasable means for automatically holding said movable shifting means immovable in each of said sound box positions, and a plurality of means operable independently for respectively effecting release of said releasable means.

2. In a dictating machine, in combination, a record support, a sound box movable cyclically in relation to said support from a recording position to a neutral position, a reproducing position and back to recording position, shift means constantly tending to move said sound box from one position to another to complete said cycle of operations comprising a continuously rotatable frictionally driven member operatively coupled to said sound box to effect said cyclic movement, a plurality of devices adapted to successively to interrupt the rotation of said member for stopping said sound box in each of its said positions, and means operable selectively to render said devices inoperative.

3. In a dictating machine, in combination, a record support, a sound box movable cyclically in relation to said support from a recording position to a neutral position, a reproducing position and back to recording position, shift means constantly tending to move said sound box from one position to another to complete said cycle of operations comprising a continuously rotatable frictionally driven member operatively coupled to said sound box to effect said cyclic movement and having a detent tooth projecting from a surface thereof, a plurality of pawls biased to contact said surface and successively engage said tooth for stopping said sound box in each of its said positions, and means operable selectively to remove said pawls from out the path of said tooth.

4. In a dictating machine, in combination, a record support, a reciprocatory sound box movable relatively to said support to recording, neutral and reproducing positions, shift means constantly tending to move said sound box successively from one position to another comprising a shaft rotatably mounted on said machine and passing loosely through said carriage, means tending constantly to rotate said shaft, means selectively operable to interrupt the rotation of said shaft, a cam mounted to travel with said carriage in sliding relation to said shaft and rotatable with said shaft, and means on said carriage adapted to effect reciprocative movement of said sound box in response to rotative movement of said cam.

5. In a dictating machine, in combination, a record support, a carriage having forward and backspace movement relative to said support, a sound box on said carriage movable cyclically relatively to said record support from a recording position to a neutral position, to a reproducing position and back to recording position, drive means for said carriage in driving connection with a continuously movable member adapted to shift said sound box selectively through said cycle of movements, said driving connection comprising a plurality of releasible stopping means normally biased respectively to engage said member and stop movement of said member to bring said sound box to rest in a different predetermined one of its said positions, and means operable selectively to release said stopping means from engagement with said member.

6. In a dictating machine, in combination, a record support, a carriage having forward and backspace movement relative to said support, a sound box on said carriage movable cyclically relatively to said record support from a recording position to a neutral position, to a reproducing position and back to recording position, drive means for said carriage in driving connection with a continuously movable member adapted to shift said sound box selectively through said cycle of movements, said driving connection comprising a plurality of releasible stopping means normally biased respectively to engage said member and stop movement of said member to bring said sound box to rest in a different predetermined one of its said positions, forward and backspace control means for said carriage drive means, and means operable in response to operation of the backspace control means for releasing from engagement with said sound box shift member the appropriate stopping means for enabling said shift member to move said sound box out of recording position.

7. In a dictating machine, in combination, a record support, a carriage having forward and backspace movement relative to said support, a sound box on said carriage movable cyclically relatively to said record support from a recording position to a neutral position, to a reproducing position and back to recording position, drive means for said carriage in driving connection with a continuously movable member adapted to shift said sound box selectively through said cycle of movements, said driving connection comprising a plurality of releasible stopping means normally biased respectively to engage said member and stop movement of said member to bring said sound box to rest in a different predetermined one of its said positions, forward and backspace control means for said carriage drive means, and means operable in response to operation of the forward space control means for releasing from engagement with said sound box shift member the appropriate stopping means for enabling said shift member to move said sound box from its neutral position.

8. In a dictating machine, in combination, a record support, a carriage having forward and backspace movement relative to said support, a sound box on said carriage movable cyclically relatively to said record support from a recording position to a neutral position, to a reproducing position and back to recording position, drive means for said carriage in driving connection with a continuously movable member adapted to shift said sound box selectively through said cycle of movements, said driving connection comprising a plurality of releasible stopping means normally biased respectively to engage said member and stop movement of said member to bring said sound box to rest in a different predetermined one of its said positions, a marker movable with said carriage to indicate the point of farthest advance of the sound box during recording, and means on said carriage adapted to cooperate with said marker to release the appropriate stopping means for enabling said shift member to move said sound box from its reproducing position.

9. In a dictating machine, in combination, a record support, a carriage having forward and backspace movement relative to said support, control means for each movement, a sound box movable cyclically from a recording to a neutral position, to a reproducing position and back to recording position, drive means for said carriage, a sound box shifting member in operative connection with said drive means for constantly tending to move said sound box from one position to another to complete said cycle of operations, independent means normally conditioned to disable said operative connection to stop said sound box in said neutral and recording positions, forward and backspace control means for said carriage drive, and means operable in response to operation of said control means for selectively rendering said disabling means inoperative.

10. In a dictating machine, in combination, a record support, a carriage, drive means for imparting forward and backspace movements to said carriage relative to said support, control means for each movement, a sound box on said carriage movable cyclically in relation to said support from a recording position to a neutral position, a reproducing position and back to recording position, shift means associated with said drive means constantly tending to move said sound box from one position to another to complete said cycle of operations, means for stopping said shift means in each of said positions of said sound box, means operable in response to operation of the backspace control to initiate backspace movement for releasing said shift means to effect shifting of said sound box from its recording position, and other means operable independently of said backspace control for releasing said shift means to effect shifting of said sound box from its recording position.

11. In a dictating machine, in combination, a record support, a carriage, drive means for imparting forward and backspace movements to said carriage relative to said support, control means for each movement, a sound box on said carriage movable cyclically in relation to said support from a recording position to a neutral position, a reproducing position and back to recording position, shift means associated with said drive means constantly tending to move said sound box from one position to another to complete said cycle of operations, means for stopping said shift means in each of said positions of said sound box, means operable in response to the operation of the forward space control for releasing said shift means to effect shifting of said sound box from its neutral position, a marker movable with said carriage to indicate the point of farthest advance of the sound box during recording, and cooperating means on said carriage and said marker for rendering the reproducing position stopping means for said shift means inoperative, whereby upon manipulation of said forward space control said sound box moves directly from neutral to recording position.

12. In a dictating machine, in combination, a record support, a carriage, drive means for imparting forward and backspace movement to said carriage relative to said support, control means for each movement, a sound box on said carriage movable cyclically in relation to said support from a recording position to a neutral position, a reproducing position and back to recording position, shift means associated with said drive means constantly tending to move said sound box from one position to another to complete said cycle of operations, independent means normally conditioned to stop said shift means to hold said sound box in said neutral and recording positions, means operable in response to alternative operation of said control means for selectively rendering said stopping means inoperative, a third means for stopping said shift means to hold said sound box in reproducing position, and means automatically operable in response to a backspacing movement of said carriage for rendering said third means operative.

FREDERICK FRANZ.